United States Patent
Shiozawa et al.

(10) Patent No.: US 7,269,225 B2
(45) Date of Patent: Sep. 11, 2007

(54) SERIAL DIGITAL SIGNAL TRANSMISSION APPARATUS

(75) Inventors: Takahiro Shiozawa, Tokyo (JP); Kurenai Murakami, Tokyo (JP); Nobuto Kawataka, Tokyo (JP)

(73) Assignee: NEC Corporation, Tokyo (JP)

(*) Notice: Subject to any disclaimer, the term of this patent is extended or adjusted under 35 U.S.C. 154(b) by 766 days.

(21) Appl. No.: 10/629,596

(22) Filed: Jul. 30, 2003

(65) Prior Publication Data
US 2004/0022330 A1    Feb. 5, 2004

(30) Foreign Application Priority Data
Jul. 31, 2002    (JP) .............................. 2002-222852

(51) Int. Cl.
*H04K 1/10*    (2006.01)

(52) U.S. Cl. ........................ 375/260; 375/295; 375/316
(58) Field of Classification Search ................ 375/295, 375/371, 376, 316; 370/466, 395.62, 395.6, 370/503, 314, 328, 156, 474, 545; 327/147
See application file for complete search history.

(56) References Cited

U.S. PATENT DOCUMENTS

| | | | |
|---|---|---|---|
| 5,555,261 A * | 9/1996 | Nakayama et al. | 370/474 |
| RE36,633 E * | 3/2000 | Fleischer et al. | 375/354 |
| 6,130,708 A * | 10/2000 | Kitagawa et al. | 348/184 |
| 6,807,180 B1 * | 10/2004 | Restivo | 370/395.62 |
| 2002/0191645 A1 * | 12/2002 | Lauret | 370/516 |

OTHER PUBLICATIONS

Lee et al., Design of ATM AAL1 SAR for Circuit Emulation, Sep. 1998, IEEE Transactions on Communications, vol. 46.*
Lau et al., Synchronous Techniques for Timing Recovery in BISDN, 1995, IEEE Transactions on Communications, vol. 43.*

* cited by examiner

*Primary Examiner*—Chieh M. Fan
*Assistant Examiner*—Julia Tu
(74) *Attorney, Agent, or Firm*—Sughrue Mion Pllc.

(57) ABSTRACT

A serial digital signal transmission apparatus can transmit HDTV digital serial signals with little jitter while utilizing the SRTS method. In the apparatus, parallel clocks are counted by an N counter to be supplied to the latch circuit, which latches the output count of a p-bit counter, RTSs are supplied from the latch circuit, as the result of comparison gated by a gate circuit is supplied to a PLL circuit and multiplied by N, parallel clocks of 74.25 MHz or 74.25/1.001 MHz, which are inputs to the N counter are regenerated (N is 8, 15 or 16), and transmitted data undergo parallel-to-serial conversion by a PS converter with these parallel clocks.

6 Claims, 8 Drawing Sheets

# SERIAL DIGITAL SIGNAL TRANSMISSION APPARATUS

BACKGROUND OF THE INVENTION

1. Field of the Invention

The present invention relates to a serial digital signal transmission apparatus for a high definition television (HDTV) signal, and more particularly to a transmission apparatus for transmitting serial digital interface signals for high definition television signal (HD-SDI; High Definition Television Serial Digital Interface).

2. Description of the Related Art

As a system of transmitting continuous bit rate (CBR) signals asynchronous with a network clock in a synchronous digital hierarchy (SDH) network, a pulse stuffing method is known. This pulse stuffing method is technique to adjust bit intervals to make it constant by inserting extra bits (stuffing bits).

On the other hand, a method of transmitting continuous bit rate (CBR) signals asynchronous with a network clock in an asynchronous transfer mode (ATM) network is prescribed in the Recommendation I.363.1 (B-ISDN ATM Adaptation Layer Specification: Type 1 AAL) of the ITU Telecommunication Standardization Sector (ITU-T). This specification prescribes (in 2.5.2.2.2 (Synchronous Residual Time Stamp (SRTS) method), p. 14) with respect to CBR signals a synchronous residual time stamp (SRTS) method whereby a residual time stamp value (RTS value), which is the difference between the respective least significant four bits of the actual count of the system clock while the CBR clock is counted a given number of times and the predictable count, is transferred from the transmitting side to the receiving side to reduce the quantity of information to be transmitted because, in an asynchronous transfer in which signals asynchronous with the network clock are sent from the transmitting side, the reproduction of the clock frequency on the transmitting side is needed on the receiving side.

However, this pulse stuffing method cannot be applied where CBR signals are high speed signals, such as HDTV serial digital signals (HD-SDI) of 1.485 Gb/s. Nor can the synchronous residual time stamp (SRTS) method by which CBR signals asynchronous with a network clock are transmitted in an ATM network be applied as it is to high speed CBR signals, such as HDTV serial digital signals (HD-SDI) whose bit rate is 1.485 Gb/s, because it is prescribed for network clocks of 155.52 MHz (STM-1).

The SRTS method has another problem that, since it involves many parameters that can be determined as the user likes, the jitter of signals on the output (receiving) side will become great and output signals can serve no practical purpose unless optimal parameters are chosen.

SUMMARY OF THE INVENTION

An object of the present invention, attempted in view of the problems noted above, is to provide a serial digital signal transmission apparatus in which clocks of HDTV serial digital signals (HD-SDI) can be transmitted with little jitter by applying the SRTS method.

Another object of the invention is to provide a serial digital signal transmission apparatus permitting efficient mapping of data and residual time stamps (RTSs) on ATM cells when transmitting HDTV serial digital signals by the SRTS method.

Still another object of the invention is to provide a serial digital signal transmission apparatus permitting efficient mapping of data and residual time stamps (RTSs) on ATM cells by establishing synchronism with the line structure of HDTV serial digital signals when transmitting them by the SRTS method.

Yet another object of the invention is to provide a serial digital signal transmission apparatus permitting efficient mapping of data and RTSs on ATM cells by establishing synchronism with the frame structure of HDTV serial digital signals when transmitting them by the SRTS method.

In order to achieve the objects of the present invention stated above, according to a first aspect of the invention, there is provided a serial digital signal transmission apparatus comprising an RTS generator circuit for, separating HDTV serial digital signals to be transmitted and time information RTSs and transmitting them as separated, and an RTS receiver circuit for receiving the parallel data and the time information RTSs that have been transmitted and obtaining the HDTV serial digital signals as they were originally, wherein:

the RTS generator circuit has first frequency dividing means for dividing a network clock into a prescribed first frequency, a serial-to-parallel converter for subjecting the HDTV serial digital signals to be transmitted to serial-to-parallel conversion, transmitting data of the resultant parallel signals and supplying clocks divided into a second frequency, a first counter for dividing the frequency-divided clocks supplied from the serial-to-parallel converter into a 1/N frequency, and a latch circuit for latching at the output timing of the first counter clocks resulting from the frequency division by the first frequency dividing means to supply the time information RTSs, and the RTS receiver circuit comprises second frequency dividing means for dividing the frequency of the network clock into the prescribed first frequency, gate pulse generating means for generating a gate pulse on the basis of the network clock, memory means for temporarily storing the RTSs which have been transmitted, a comparator for comparing clocks resulting from frequency division by the second frequency dividing means and the RTSs read out of the memory means, a gate circuit for gating the output signal of the comparator on the basis of the gate pulse from the gate pulse generating means, frequency multiplying means for regenerating clocks of the second frequency by multiplying the frequency of the output signal of the gate circuit to the N-multiplied frequency, and a parallel-to-serial converter for receiving as its inputs regenerated clocks of the second frequency supplied from the frequency multiplying means and data of the parallel signals that have been transmitted, and subjecting these to parallel-to-serial conversion to obtain the HDTV serial digital signals, 8, 15 or 16 being selected as the value of the N.

According to this aspect of the invention, when transmitting HDTV serial digital signals which are high speed continuous bit rate (CBR) signals, the clock of the HDTV serial digital signals can be transmitted by using the SRTS method.

Also in order to achieve the objects stated above, according to a second aspect of the invention, there is provided a serial digital signal transmission apparatus comprising a serial-to-parallel converter for separating HDTV serial digital signals to be transmitted into a parallel data and a first clock, an RTS generator circuit for generating time information RTSs on the basis of the first clock and a network clock, an ATM cell processing unit for assembling the RTSs and parallel data into ATM cells of a prescribed structure and transmitting the assembled cells and separating received ATM cells of the prescribed structure into the RTSs and parallel data, an RTS receiver circuit for regenerating the first clock as they originally were on the basis of the separated time information RTSs and network clock, and a parallel-to-serial converter for obtaining the HDTV serial digital signals from the separated parallel data and the first clock from the RTS receiver circuit, wherein:

the RTS generator circuit has first frequency dividing means for dividing the network clock into a second clock of a prescribed frequency, a first counter for dividing the first clock into a 1/N frequency, and a latch circuit for latching at the output timing of the first counter the second clock resulting from the frequency division by the first frequency dividing means to supply the time information RTSs, the RTS receiver circuit comprises second frequency dividing means for dividing the frequency of the network clock into the prescribed frequency, gate pulse generating means for generating a gate pulse on the basis of the network clock, memory means for temporarily storing the RTSs which have been transmitted, a comparator for comparing the clock resulting from frequency division by the second frequency dividing means and the RTSs read out of the memory means, a gate circuit for gating the output signal of the comparator on the basis of the gate pulse from the gate pulse generating means, and frequency multiplying means for regenerating the first clock frequency by multiplying the frequency of the output signal of the gate circuit to the N-multiplied frequency, wherein the ATM cell processing unit, besides selecting 8 as the value of the N, multiplexes 180 bytes of the HDTV serial digital signals on four of the ATM cells to generate ATM cells on whose remainder of payload are multiplexed nine of the time information RTSs corresponding to the 180 bytes of HDTV serial digital signals.

According to the second aspect of the invention, when transmitting in ATM cells HDTV serial digital signals which are high speed continuous bit rate (CBR) signals, the HDTV serial digital signals and RTS can be multiplexed on the ATM cells and transmitted by using the SRTS method.

Further, in order to achieve the objects stated above, according to a third aspect of the invention, the RTS generator circuit has first frequency dividing means for dividing the network clock into a second clock of a prescribed frequency, a first counter for dividing the first clock into a 1/N frequency, and a latch circuit for latching at the output timing of the first counter the second clock resulting from the frequency division by the first frequency dividing means to supply the time information RTSs, the RTS receiver circuit comprises second frequency dividing means for dividing the frequency of the network clock into the prescribed frequency, gate pulse generating means for generating a gate pulse on the basis of the network clock, memory means for temporarily storing the RTSs which have been transmitted, a comparator for comparing the clock resulting from frequency division by the second frequency dividing means and the RTSs read out of the memory means, a gate circuit for gating the output signal of the comparator on the basis of the gate pulse from the gate pulse generating means, and frequency multiplying means for regenerating the first clock frequency by multiplying the frequency of the output signal of the gate circuit to the N-multiplied frequency, but, unlike according to the fourth aspect of the invention, the ATM cell processing unit, besides selecting 8 as the value of the N, multiplexes 5500 bytes of the HDTV serial digital signals on 123 of the ATM cells to generate ATM cells on whose remainder of payload are multiplexed 275 of the time information RTSs corresponding to the 5500 bytes of HDTV serial digital signals.

According to the third aspect of the invention, when transmitting in ATM cells HDTV serial digital signals which are high speed continuous bit rate (CBR) signals, 5500 bytes constituting one line of the HDTV serial digital signals can be multiplexed on 123 ATM cells to be transmitted, and can be synchronized with the line structure of the HDTV serial digital signals.

Further, according to a fourth aspect of the invention, the RTS generator circuit has first frequency dividing means for dividing the network clock into a second clock of a prescribed frequency, a first counter for dividing the first clock into a 1/N frequency, and a latch circuit for latching at the output timing of the first counter the second clock resulting from the frequency division by the first frequency dividing means to supply the time information RTSs, the RTS receiver circuit comprises second frequency dividing means for dividing the frequency of the network clock into the prescribed frequency, gate pulse generating means for generating a gate pulse on the basis of the network clock, memory means for temporarily storing the RTSs which have been transmitted, a comparator for comparing the clock resulting from frequency division by the second frequency dividing means and the RTSs read out of the memory means, a gate circuit for gating the output signal of the comparator on the basis of the gate pulse from the gate pulse generating means, and frequency multiplying means for regenerating the first clock frequency by multiplying the frequency of the output signal of the gate circuit to the N-multiplied frequency, but, unlike according to the fourth aspect of the invention, said ATM cell processing unit, besides selecting 15 as the value of said N, multiplexes 375 bytes of said HDTV serial digital signals on eight of said ATM cells to generate ATM cells on whose remainder of payload and RTS area of SAR-PDU header are multiplexed 10 of said time information RTSs corresponding to the 375 bytes of HDTV serial digital signals.

According to the fourth aspect of the invention, when transmitting in ATM cells HDTV serial digital signals which are high speed continuous bit rate (CBR) signals, 49500000 bits constituting one frame of HDTV serial digital signals can be transmitted in 132000 ATM cells to be, and can be synchronized with the frame structure of the HDTV serial digital signals.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

Next will be described preferred embodiments of the present invention with reference to the accompanying drawings.

Figure 1A:
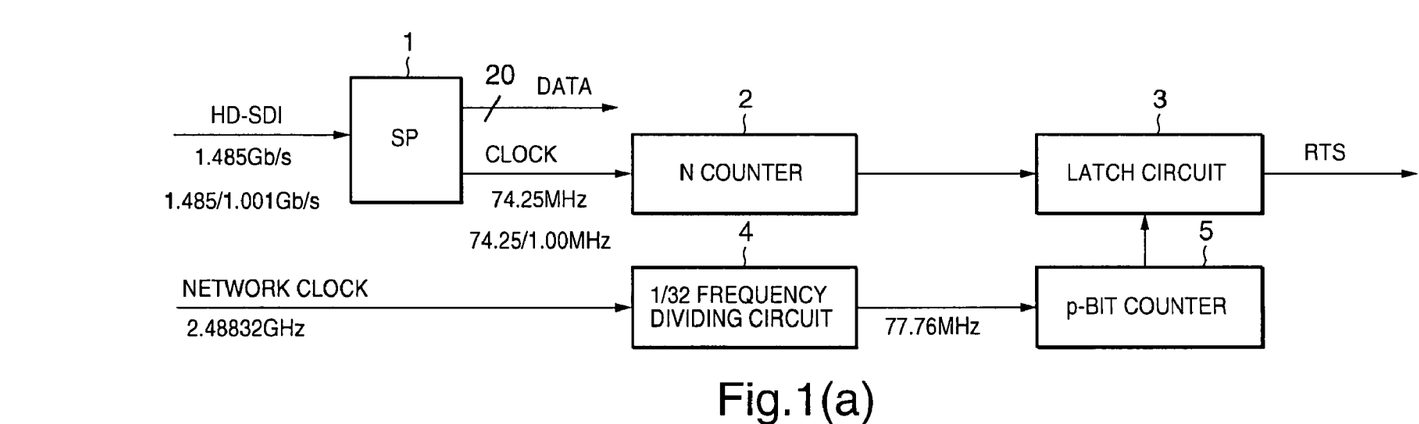
FIG. 1(a) and FIG. 1(b) are block diagrams of a RTS generator circuit and a RTS receiver circuit according to a first embodiment of the invention.

The RTS generator circuit shown in FIG. 1(a) comprises a serial-to-parallel (SP) converter 1 for subjecting serial-to-parallel conversion of HDTV serial digital signals, an N counter 2, a latch circuit 3, a 1/32 frequency dividing circuit 4 for dividing the 2.48832 MHz frequency of a network clock into a frequency of 1/32, and a p-bit counter 5 for counting the output signals of the 1/32 frequency dividing circuit 4. The bit rate of the HDTV serial digital signals (HD-SDI) is either 1.485 Gb/s or 1.485/1.001 Gb/s.

Figure 1B:
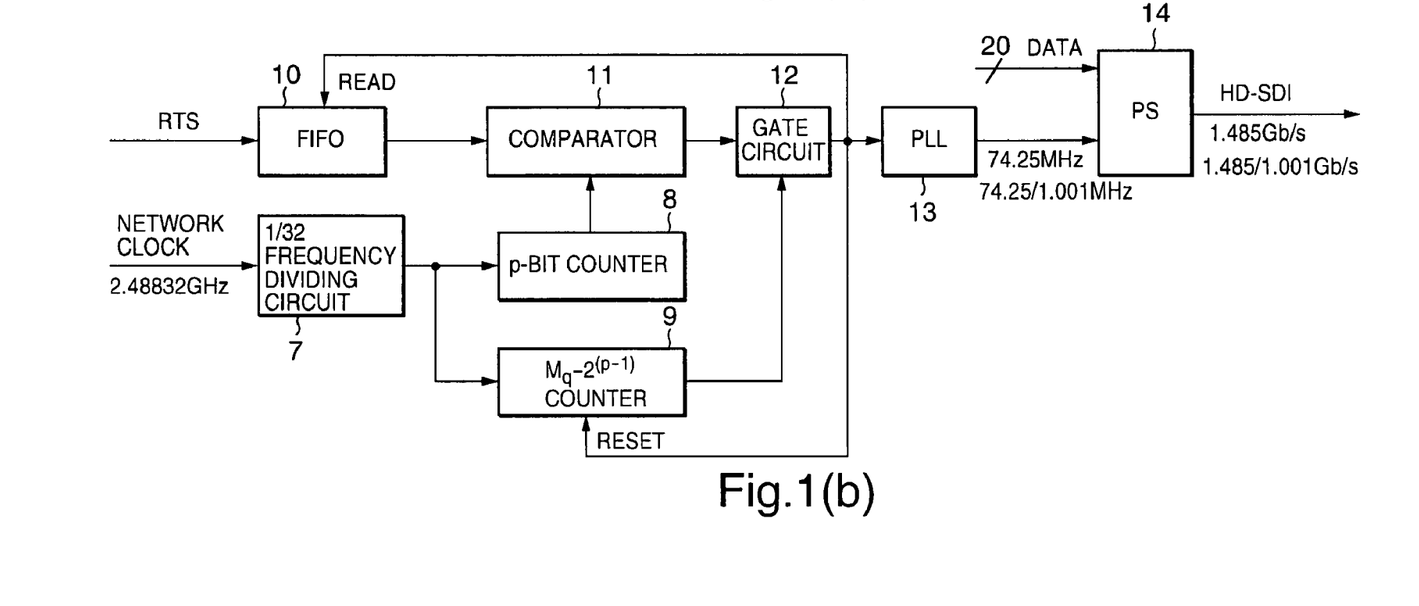

The RTS receiver circuit shown in FIG. 1(b) comprises a 1/32 frequency dividing circuit 7 for dividing the 2.48832 MHz frequency of the network clock into a frequency of 1/32, a p-bit counter 8, an $M_q-2^{(p-1)}$ counter 9, a first-in first-out storage (FIFO) 10 as memory means for temporary storage of transmitted RTSs which are entered, a comparator 11 for comparing the output signal of the FIFO 10 and that of the p-bit counter 8, a gate circuit 12 for gating the output signal of the comparator 11 on the basis of the output signal of the $M_q-2^{(p-1)}$ counter 9, a phase locked loop (PLL) circuit 13 for multiplying by N the output signal of the gate circuit 12, and a parallel-to-serial (PS) converter 14 to regenerate the HDTV serial digital signal (HD-SDI) from the transmitted data and parallel clocks of 74.25 MHz or 74.25/1.001 MHz supplied from the PLL circuit 13.

Here, $M_q$ is the largest integer that does not surpass the average count M of the clocks resulting from frequency division by 32 of network clocks in N periods of the serial clocks of the HDTV serial digital signals (HD-SDI). Whereas the value of N in multiplication used in the N counter 2 and the PLL circuit 13 for the RTS generator circuit and the RTS receiver circuit in the first embodiment of the invention is supposed to be "8", "15" or "16", in this case $M_q$ is "8", "15" or "16". While the value of p for the p-bit counters 5 and 8 can be set as desired, if p=1 for instance, the $M_q-2^{(p-1)}$ counter 9 will be a 7-bit counter (where $N=M_q=8$), a 14-bit counter (where $N=M_q=15$) or a 15-bit counter ($N=M_q=16$).

Next will be described the operation of this embodiment shown in FIG. 1(a) and FIG. 1(b) with reference to the timing charts of FIG. 2. The RTS generator circuit may count clocks of 77.76 MHz eight times or seven times, depending on which the RTS may be 1 or 0. The timing charts of the RTS receiver circuit shown in timings (E) through (J) of FIG. 2 to be referred to afterwards show cases in which the RTS is 1 and 0.

First to describe the operation of the RTS generator circuit of FIG. 1(a), since the network clock of 2.48832 GHz is too high in frequency and difficult to use as it is, its frequency is divided by the 1/32 frequency dividing circuit 4 to 77.76 MHz, 1/32 of 2.48832 GHz, and the frequency-divided clock is supplied to and counted by the p-bit counter 5.

On the other hand, HDTV serial digital signals (HD-SDI) of 1.485 Gb/s or 1.485/1.001 Gb/s in bit rate are converted by the serial-to-parallel (SP) converter 1 into 20-bit parallel signals to be transmitted as data, and at the same time undergo extraction of parallel clocks of 74.25 MHz or 74.25/1.001 MHz resulting from frequency division by 20. The parallel clocks are counted by the N counter 2 and supplied as a latch pulse at every N counts to the latch circuit 3, where the output counts of the p-bit counter 5 are latched. This causes the latch circuit 3 to supply RTSs.

Figure 2:
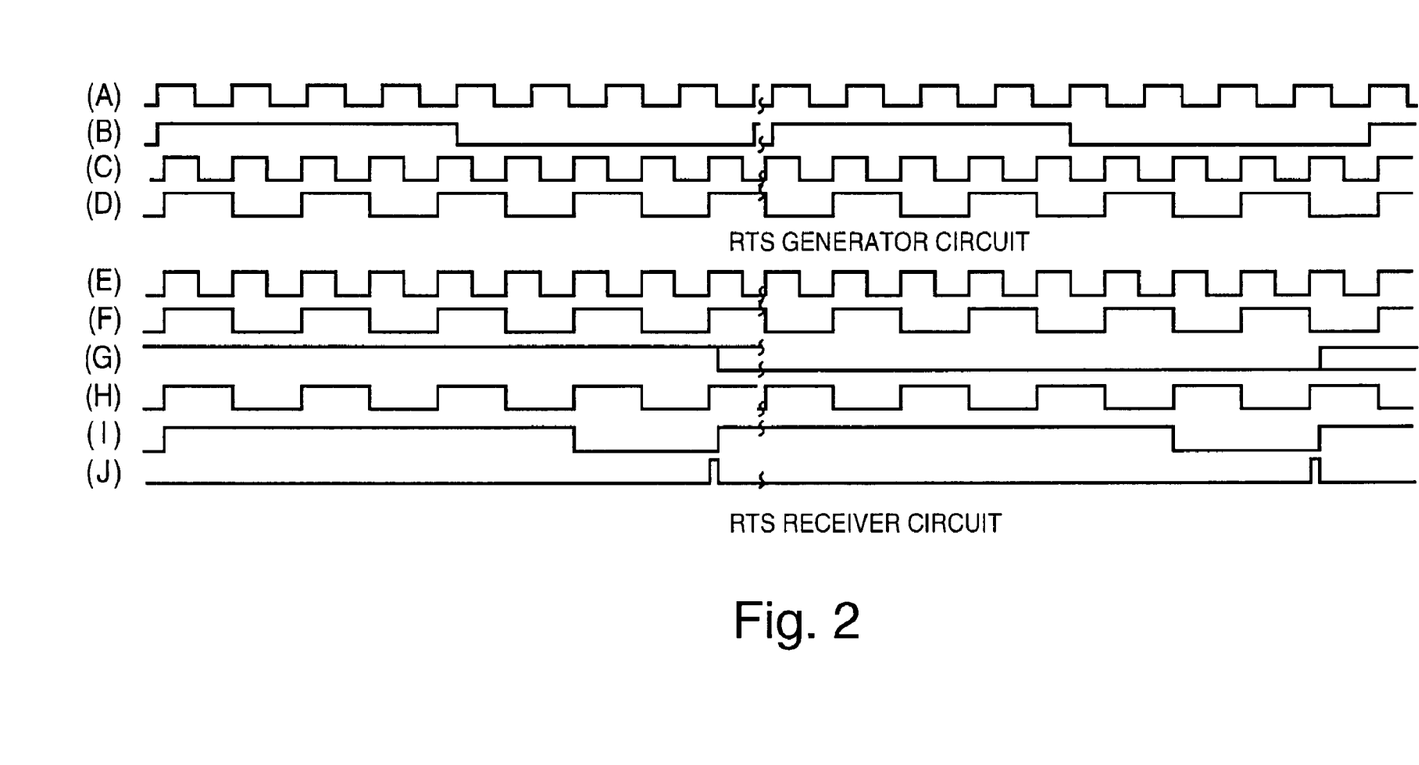
FIG. 2 shows timing charts for describing the operation of the circuits shown in FIG. 1(a) and FIG. 1(b)

In FIG. 2, timing (A) shows the above-mentioned parallel clock of 74.25 MHz; timing (B), the output latch pulse of the N-bit counter 2; timing (C), the clock of 77.76 MHz supplied from the 1/32 frequency dividing circuit 4; and timing (D), the output signal of the p-bit counter 5.

Next will be described the operation of the RTS receiver circuit shown in FIG. 1(b). As in the RTS generator circuit, the network clock of 2.48832 GHz, after undergoing frequency division by the 1/32 frequency dividing circuit 7 to 77.76 MHz, i.e. 1/32 of 2.48832 GHz, is supplied to and counted by the p-bit counter 8, and also supplied to and counted by the $M_q-2^{(p-1)}$ counter 9. Timing (E) shows the clock of 77.76 MHz supplied from the 1/32 frequency dividing circuit 7; timing (F), the output signal of the p-bit counter 8; and timing (I), the output signal of the $M_q-2^{(p-1)}$ counter 9.

On the other hand, an RTS that has been transmitted, after being once supplied to the FIFO 10 and stored therein, is read out as shown in timing (G), entered into the comparator 11, and compared with the count of the p-bit counter 8, the result of comparison being supplied to the gate circuit 12. Timing (H) shows a pulse, which is the result of comparison supplied from the comparator 11. The gate circuit 12 performs gate operation on the basis of a gate pulse from the $M_q-2^{(p-1)}$ counter 9. Here, $M_q$ is the largest integer that does not surpass the average count M of the clocks resulting from frequency division by 32 of network clocks in N periods of the serial clocks of HDTV serial digital signals (HD-SDI).

As the result of comparison (pulse) gated on the basis of the gate pulse shown in timing (I) and supplied by the gate circuit 12 becomes another pulse shown in timing (J), which is a signal resulting from regeneration of the output signal of the N counter 2 in the RTS generator circuit, parallel clocks of 74.25 MHz or 74.25/1.001 MHz, which are input signals to the N counter 2, are regenerated by further supplying this result of comparison to the PLL circuit 13 to be multiplied by N.

By subjecting the data of 20-bit parallel signals which have been transmitted to parallel-to-serial conversion by the parallel-to-serial (PS) converter 14 by these parallel clocks, HDTV serial digital signals (SD-HDI) are regenerated. Further, the output pulse of the gate circuit 12 is used for resetting the $M_q-2^{(p-1)}$ counter 9 and as a timing signal for reading RTS out of the FIFO 10.

To add, while the output pulse of (result of comparison by) the gate circuit 12 in the RTS receiver circuit shown in FIG. 1(b) derives from regeneration of the output signal of the N counter 2 in the RTS generator circuit, it is subject to jitter as a matter of principle because it is regenerated with reference to the clock resulting from frequency division by 32 of the network clock. It is necessary to so determine parameters as not to allow jitter having low frequency components to become greater because it cannot be suppressed by the PLL circuit 13 though jitter having high frequency components can be.

Figure 7A:
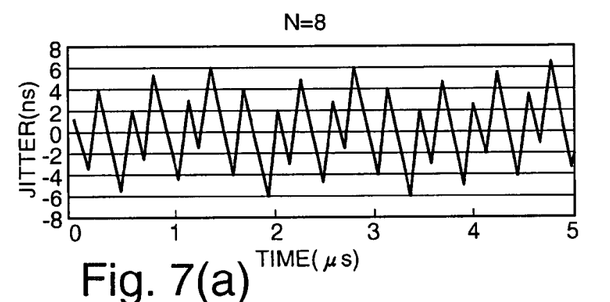
FIG. 7(a) to FIG. 7(f) are diagrams showing waveforms over time of jitter at the comparator output of the RTS receiver circuit shown in FIG. 1(b) and frequency characteristics obtained from the waveform over time by discrete Fourier transform.
Figure 7B:
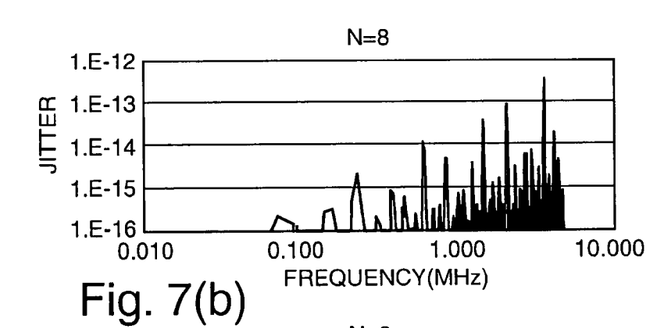
Figure 7C:
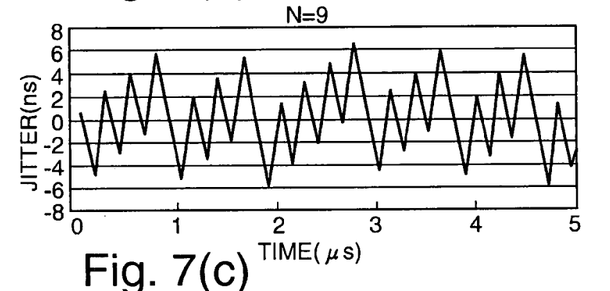
Figure 7D:
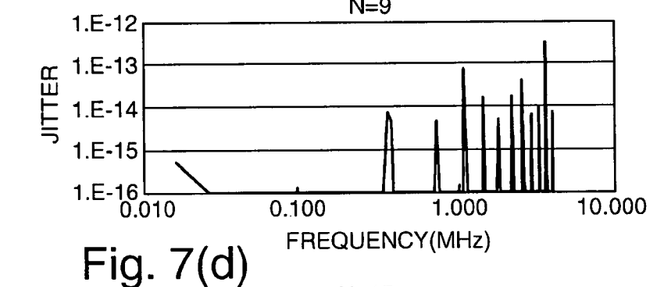
Figure 7E:
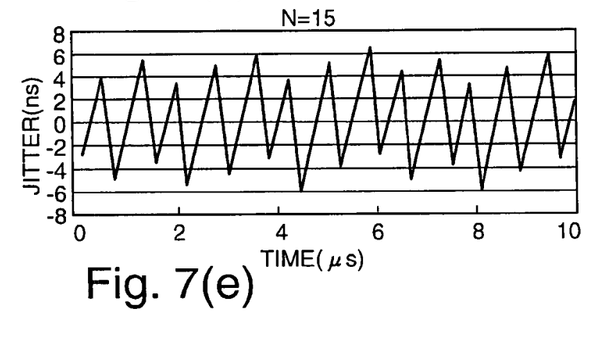
Figure 7F:
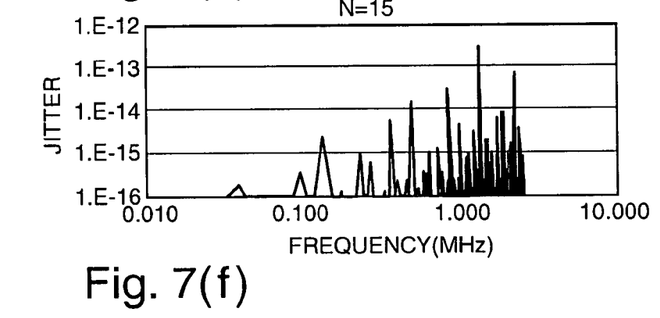

FIG. 7(a), FIG. 7(c) and FIG. 7(e) are diagrams showing the waveform over time of jitter at the output of the gate circuit 12 in the RTS receiver circuit shown in FIG. 1(b) when the count of "N" of the N counter 2 of the RTS generator circuit shown in FIG. 1(a) is set to "8", "9" or "15", respectively, and FIG. 7(b), FIG. 7(d) and FIG. 7(e) show frequency characteristics obtained from the waveforms over time by discrete Fourier transform, which waveforms are shown in FIG. 7(a), FIG. 7(c) and FIG. 7(e), respectively.

Figure 8A:
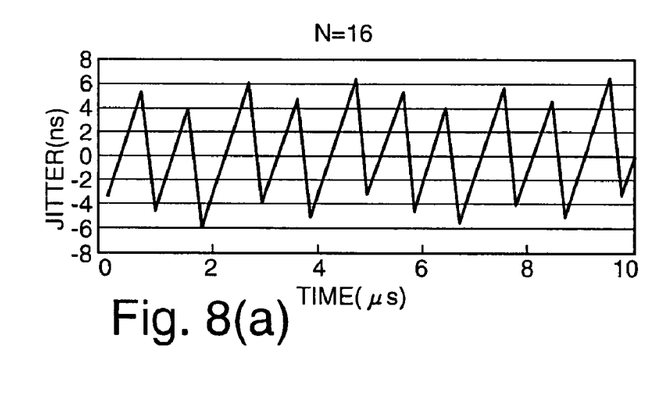
FIG. 8(a) to FIG. 8(d) are other diagrams showing waveforms over time of jitter at the comparator output in the RTS receiver circuit shown in FIG. 1(b) and frequency characteristics obtained from the waveform over time by discrete Fourier transform.
Figure 8B:
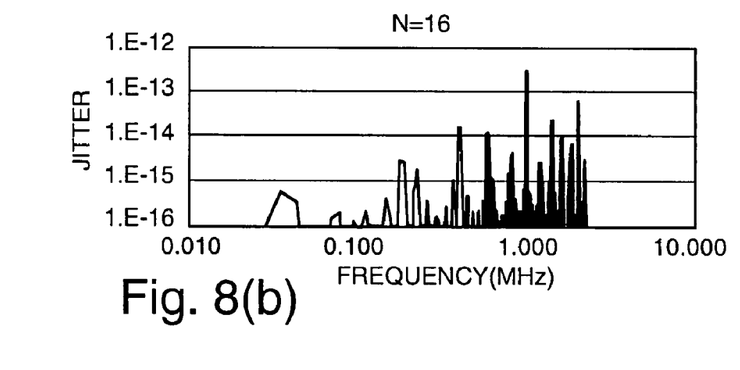
Figure 8C:
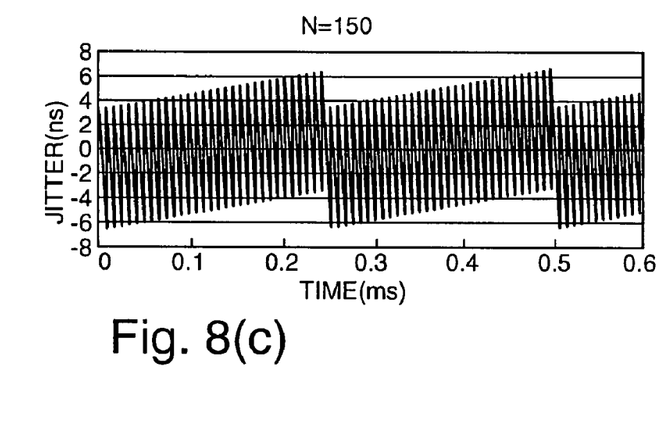
Figure 8D:
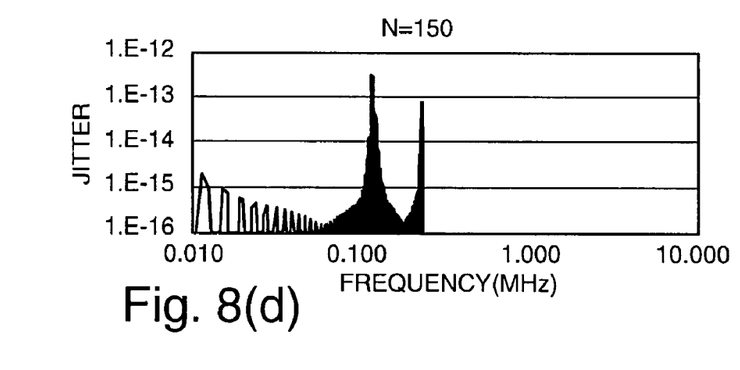

FIG. 8(a) and FIG. 8(c) are diagrams showing the waveforms over time of jitter at the output of the gate circuit 12 in the RTS receiver circuit shown in FIG. 1(b) when "N" of the N counter 2 is set to "16" or "150". FIG. 8(b) and FIG. 8(d) show frequency characteristics obtained from the waveform over time by discrete Fourier transform, which waveforms are shown in FIG. 8(a) and FIG. 8(c), respectively. In both diagrams, HDTV serial digital signals (HD-SDI) are supposed to be 1.485/1.001 Gb/s in frequency.

As is seen from FIG. 7(a) to FIG. 7(f) and FIG. 8(a) and FIG. 8(d), when "N" of the N counter 2 is set to "9" or "150", jitter has a relatively great low frequency content, but when "N" of the N counter 2 is set to "8", "15", "16", jitter has a relatively small low frequency content. This embodiment of the invention transmits HDTV serial digital signals (HD-SDI) by the SRTS method with relatively little jitter by setting "N" of the N counter 2 to "8", "15" or "16".

Figure 3:
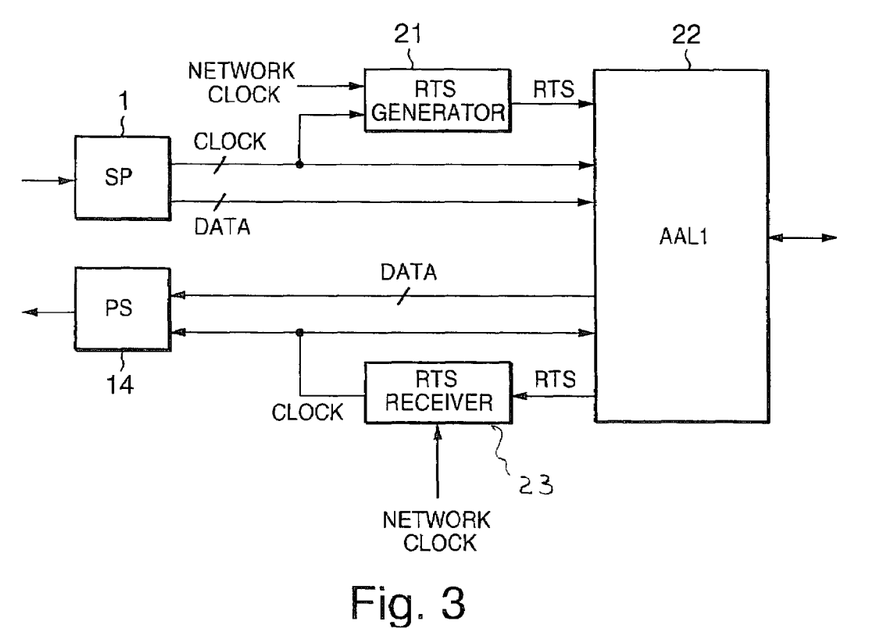
FIG. 3 shows a schematic configuration of another embodiment of the invention.

Next will be described a second embodiment of the present invention. FIG. 3 shows a schematic configuration of serial digital signal transmission apparatus, which is another embodiment of the invention. In FIG. 3, the same constituent elements as in FIG. 1(a) and FIG. 1(b) are represented by respectively the same reference signs. In FIG. 3, an RTS generator circuit 21 has a circuit configuration other than that of the SP converter 1 shown in FIG. 1(a), and an RTS receiver circuit 23 has a circuit configuration other than that of the PS converter 14 shown in FIG. 1(b). In the second embodiment of the invention, the count of "N" of the N counter 2 in the RTS generator circuit 21 and the value of multiplier "N" of the PLL circuit 13 in the RTS receiver circuit 23 are both "8", and the ATM cell structure is provided by an AAL1 circuit (ATM cell processing unit) 22 whose ATM adaptation layer (AAL) is of type 1 as shown in FIG. 4.

Figure 4:
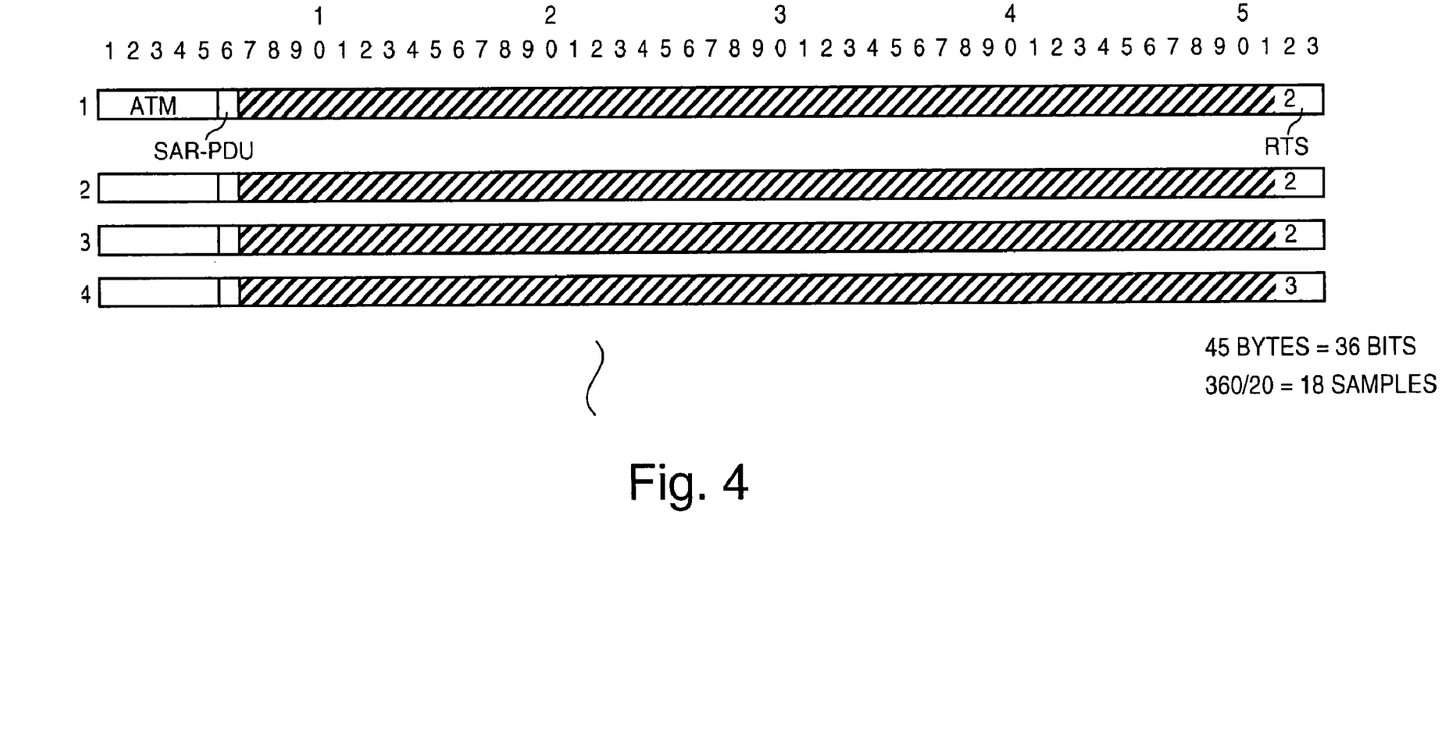
FIG. 4 illustrates ATM cell structure applied in the embodiment of the invention shown in FIG. 3.

Thus, the AAL1 circuit 22 of FIG. 3 generates and supplies ATM cells of the structure shown in FIG. 4 on the basis of RTS entered from the RTS generator circuit 21 and clocks and data entered from the SP converter 1, receives ATM cells of the structure shown in FIG. 4, entered from outside and, separating the data and RTS from the ATM cells, supplies the data to the PS converter 14 and RTS to the RTS receiver circuit 23 to regenerate clocks.

Whereas each ATM cell consists of a five-byte ATM header and a 48-byte information field (payload), in each ATM cell in this embodiment of the invention 45 bytes of HDTV serial digital signals are multiplexed on the 48-byte payload and RTSs, over two of the remaining bytes as shown in FIG. 4. Numerals in the ATM cells shown in FIG. 4 denote the numbers of RTSs. Since 45 bytes correspond to 18 samples of HDTV serial digital signals, HDTV serial digital signals can be readily multiplexed on ATM cells.

Then, the count of N for the 20-bit parallel clocks of HDTV serial digital signals is supposed to be "8", and one RTS is provided for every 20 bytes of HDTV serial digital signals. One byte of Segmentation and Reassembly Protocol Data Unit (SAR-PDU) is also multiplexed on the sixth byte of the ATM cell (the same applies to FIG. 5 and FIG. 6 to be referred to below).

In this embodiment of the invention, 180 bytes of HDTV serial digital signals are multiplexed on every four ATM cells, and nine RTSs corresponding to the 180 bytes of HDTV serial digital signals are multiplexed on the remainder of the payload. This enables data and RTSs to be efficiently mapped on the ATM cells.

Next will be described a third preferred embodiment of the invention. Whereas the third embodiment of the invention, as is the second embodiment, is applied to the ATM transmission apparatus of the configuration shown in FIG. 3, in this third embodiment the count of "N" of the N counter 2 in the RTS generator circuit 21 of FIG. 3 and the value of multiplier "N" of the PLL circuit 13 in the RTS generator circuit 23 are both "8", and the ATM cell structure shown in FIG. 5 is provided by the AAL1 circuit 22 whose ATM adaptation layer (AAL) is of type 1.

Figure 5:
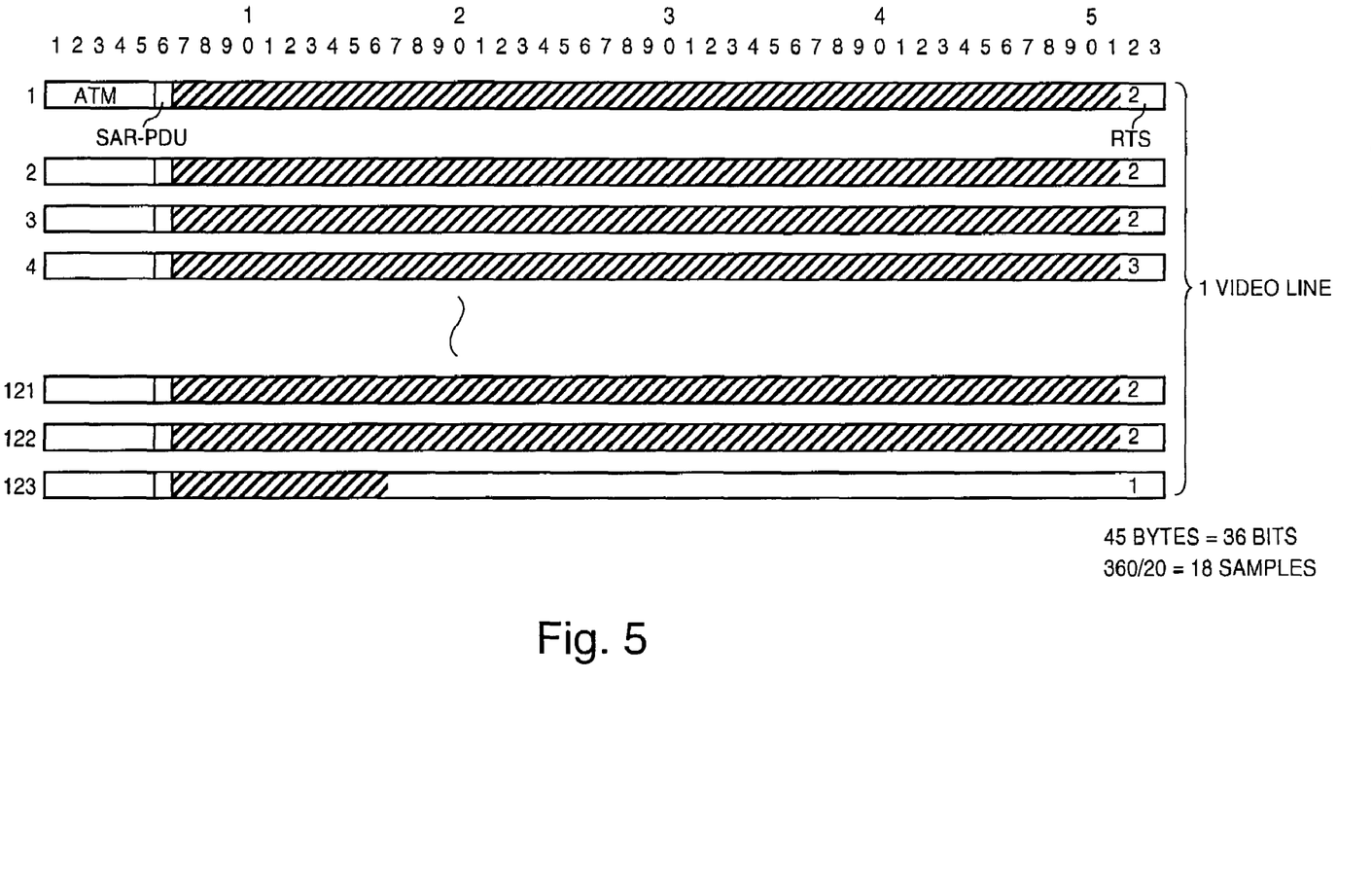
FIG. 5 illustrates another ATM cell structure applied in the embodiment of the invention shown in FIG. 3.

As shown in FIG. 5, out of 47 bytes of payload in one ATM cell, excluding the five bytes of the ATM header and one byte of SAR-PDU, 45 bytes have HDTV serial digital signals multiplexed on them, and the remaining two bytes have RTSs. The numerals in the ATM cells shown in FIG. 5 denote the numbers of RTSs. In this embodiment, a one-line equivalent of HDTV serial digital signals totaling 5500 bytes are further multiplexed on 123 ATM cells (=15+⅜ cycles). The HDTV serial digital signals in the 123rd cell will be 10 bytes. The count of N, referred to above, is supposed to be "8". In this embodiment, since 180 bytes of HDTV serial digital signals are multiplexed on four ATM cells, nine RTSs are multiplexed on every four ATM cells, though only one RTS is multiplexed on the 123rd cell.

Whereas 45 bytes of HDTV serial digital signals are supposed to be multiplexed on each ATM cell in this embodiment, since 45 bytes (=360 bits) correspond to 18 (=360/20) samples of HDTV serial digital signals, HDTV serial digital signals can be readily multiplexed on ATM cells. One RTS is provided for every 20 bytes of HDTV serial digital signals.

In this embodiment, as 180 bytes of HDTV serial digital signals are multiplexed on four ATM cells, nine RTSs are multiplexed on the four ATM cells. As a total of 100 bytes of HDTV serial digital signals are multiplexed on the 121st, 122nd and 123rd cells, five RTSs in total are multiplexed on the 121st, 122nd and 123rd cells. This enables the data and RTSs to be efficiently mapped on the ATM cells.

Figure 6:
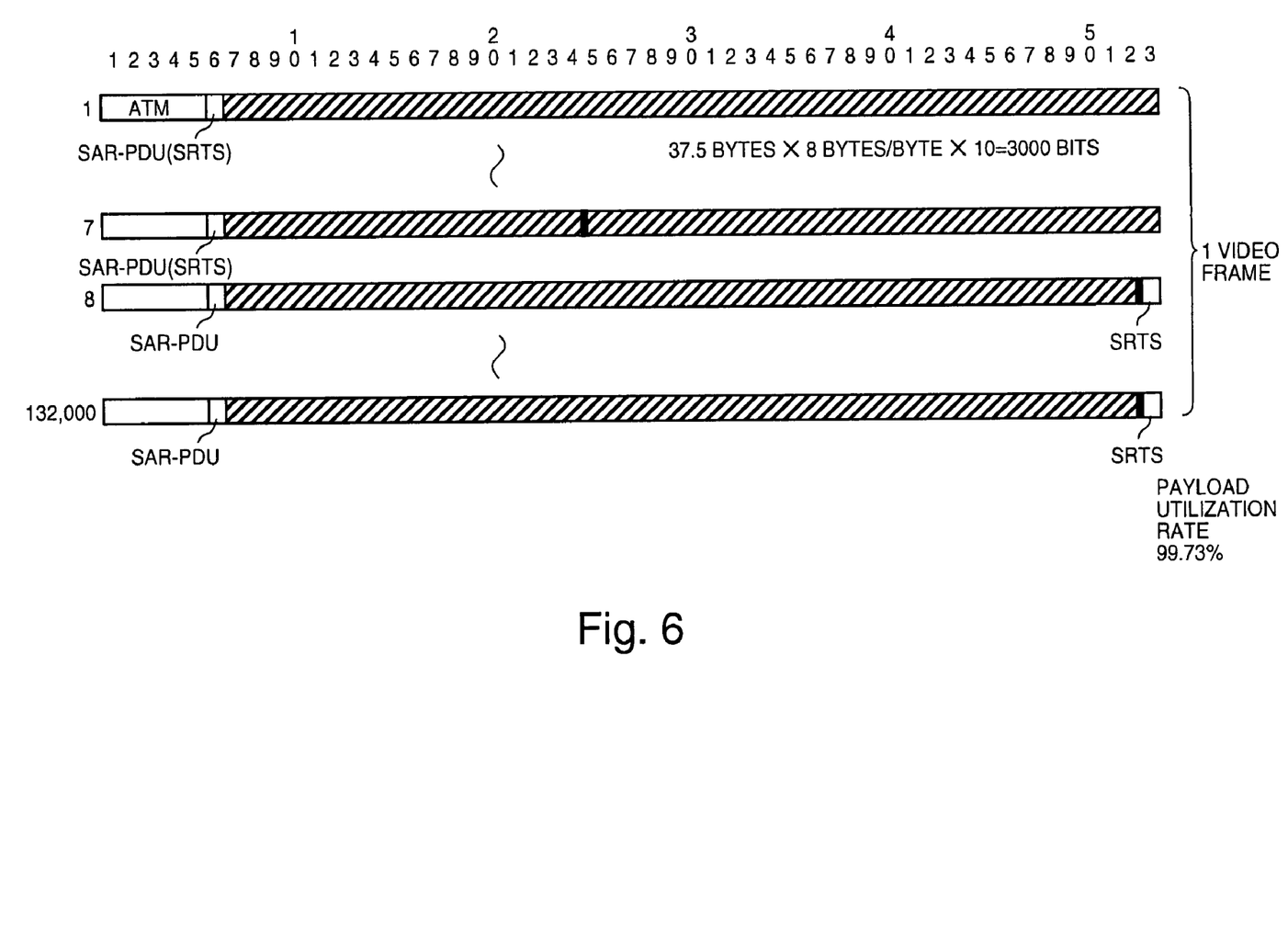
FIG. 6 illustrates a further ATM cell structure applied in the embodiment of the invention shown in FIG. 3.

Next will be described a fourth embodiment of the invention. Whereas the fourth embodiment of the invention, as are the second and third embodiments, is applied to the ATM transmission system of the configuration shown in FIG. 3, in this fourth embodiment the count of "N" of the N counter 2 in the RTS generator circuit 21 of FIG. 3 and the value of multiplier "N" of the PLL circuit 13 in the RTS generator circuit 23 are both "15", and the ATM cell structure shown in FIG. 6 is provided by the AAL1 circuit 22 whose ATM adaptation layer (AAL) is of type 1. Further in this embodiment, the value of p of the p-bit counters 5 and 8 shown in FIG. 1 is supposed to be "1".

As shown in FIG. 6, 375 bytes (=3000 bits) of HDTV serial digital signals are multiplexed on eight ATM cells, and on the remaining one byte of payload and the RTS area of the Segmentation and Reassembly Protocol Data Unit (SAR-PDU) header, 10 RTSs (10 bits supposing that each RTS consists of one bit). Then, the count of N of the N counter 2 in the RTS generator circuit 21 of FIG. 3 for the 20-bit parallel clocks of HDTV serial digital signals and the value of multiplier "N" of the PLL circuit 13 in the RTS generator circuit 23 are both "15". Further, 132000 cells (=165000 cycles) constitute one frame of HDTV serial digital signals (49500000 bits).

In this embodiment of the invention, since 375 bytes (=3000 bits) of HDTV serial digital signals per cycle multiplexed on ATM cells correspond to 150 (=$^{3000}/_{20}$) samples of HDTV serial digital signals, HDTV serial digital signals can be readily multiplexed on ATM cells. One RTS is provided per 300 bits of HDTV serial digital signals 300. This embodiment can be synchronized with the frame structure of HDTV serial digital signals, excels in the utilization efficiency of payload, and permits efficient mapping of data and RTSs on ATM cells.

The present invention is not limited to the embodiments described above. For instance, although network clocks of 2.48832 MHz are divided in frequency by 32 in the configuration shown in FIG. 1, the ratio of frequency division can be reduced to 1/16 or the like if high speed circuits become readily available in the future.

Also, though two, two, two, three and so forth of RTSs are multiplexed on ATM cells according to FIG. 3, another way of multiplexing by which the two bytes left over by multiplexing of data on the payloads of ATM cells are used is possible. For instance, if there is one bit per RTS, RTSs can as well be multiplexed collectively on the fourth ATM cell.

Further, though two, two, two, three and so forth of RTSs are multiplexed on ATM cells according to FIG. 4, another way of multiplexing by which the two bytes left over by multiplexing of data on the payloads of ATM cells are used, or still another way by which the 37 bytes left over by multiplexing of data of the 123rd cell on the payloads of ATM cells, is also possible. For instance, if there is one bit per RTS, 275 RTSs for one line can as well be multiplexed collectively on the 37 bytes left over by multiplexing of data of the 123rd cell on the payloads of ATM cells.

As hitherto described, according to the first aspects of the present invention, where HDTV serial digital signals, which are high speed continuous bit rate (CBR) are to be transmitted, clocks of the HDTV serial digital signals can be transmitted with little jitter by the SRTS method.

According to the second aspect of the invention, when HDTV serial digital signals are to be transmitted in ATM cells by the SRTS method, data and time information RTSs can be efficiently mapped on ATM cells and transmitted.

According to the third aspect of the invention, when HDTV serial digital signals are to be transmitted in ATM cells by the SRTS method, a one-line equivalent of HDTV serial digital signals totaling 5500 bytes together with time information RTSs are multiplexed on 123 ATM cells and transmitted, with the result that it is made possible to achieve synchronism with the line structure of the HDTV serial digital signals and to efficiently map data and time information RTSs on ATM cells for transmission.

According to the fourth aspect of the invention, when HDTV serial digital signals are to be transmitted in ATM cells by the SRTS method, a one-frame equivalent of HDTV serial digital signals totaling 49500000 bits together with time information RTSs are multiplexed on 132000 ATM cells and transmitted, with the result that it is made possible to achieve synchronism with the line structure of the HDTV serial digital signals and to efficiently map data and time information RTSs on ATM cells for transmission.

What is claimed is:

1. A serial digital signal transmission system comprising a residual time stamp (RTS) generator circuit for separating high definition television (HDTV) serial digital signals to be transmitted into parallel data and time information residual time stamps (RTSs) and transmitting said parallel data and said time information RTSs, and an RTS receiver circuit for receiving said parallel data and said time information RTSs that have been transmitted and obtaining said HDTV serial digital signals as they were originally, wherein:

said RTS generator circuit has:
first frequency dividing means for dividing a network clock into a prescribed first frequency,
a serial-to-parallel converter for subjecting said HDTV serial digital signals to be transmitted to serial-to-parallel conversion, transmitting data of the resultant parallel signals and supplying a clock divided into a second frequency,
a first counter for dividing said frequency-divided clock supplied from said serial-to-parallel converter into a 1/N frequency, and
a latch circuit for latching at the output timing of said first counter the clock resulting from the frequency division by said first frequency dividing means to supply said time information RTSs, and said RTS receiver circuit comprises:
second frequency dividing means for dividing the frequency of said network clock into said prescribed first frequency,
gate pulse generating means for generating a gate pulse on the basis of said network clock,
memory means for temporarily storing said RTSs which have been transmitted,
a comparator for comparing the clock resulting from frequency division by said second frequency dividing means and said RTSs read out of said memory means,
a gate circuit for gating the output signal of said comparator on the basis of said gate pulse from said gate pulse generating means,
frequency multiplying means for regenerating the clock of said second frequency by multiplying the frequency of the output signal of said gate circuit to said N-multiplied frequency, and
a parallel-to-serial converter for receiving as its inputs regenerated clock of said second frequency supplied from said frequency multiplying means and data of said parallel signals that have been transmitted, and subjecting regenerated clock and data of parallel signals to parallel-to-serial conversion to obtain said HDTV serial digital signals, 8, 15 or 16 being selected as the value of said N.

2. The serial digital signal transmission system, as claimed in claim 1, wherein said first frequency dividing means comprises a first frequency dividing circuit for dividing said network clock into a frequency of 1/32 and a first p-bit counter (p is an integer) for counting clocks supplied from said first frequency dividing circuit and obtaining a signal of said prescribed first frequency, said second frequency dividing means comprises a second frequency dividing circuit for dividing said network clock into a frequency of 1/32 and a second p-bit counter for counting clocks supplied from said second frequency dividing circuit and obtaining a signal of said prescribed first frequency, said gate pulse generating means is an "Mq$-2^{(p-1)}$" counter (where Mq is the largest integer that does not surpass the average count M of the clock resulting from frequency division by 32 of the network clock in N periods of the serial clock of HDTV serial digital signals) for counting the clock supplied from said second frequency dividing circuit and supplying said gate pulse, and said frequency multiplying means is a PLL circuit for multiplying the frequency of the output signal of said gate circuit to said N-multiplied frequency.

3. The serial digital signal transmission system, as claimed in claim 2, wherein said memory means is a FIFO storage whose read timing is determined by the output signal of said gate circuit and said "Mq–$2^{(p-1)}$" counter is reset by the output signal of said gate circuit.

4. A serial digital signal transmission apparatus comprising a serial-to-parallel converter for separating high definition television (HDTV) serial digital signals to be transmitted into a parallel data and a first clock, a residual time stamp (RTS) generator circuit for generating time information RTSs on the basis of said first clock and a network clock, an ATM cell processing unit for assembling said RTSs and parallel data into asynchronous transfer mode (ATM) cells of a prescribed structure and transmitting the assembled cells and separating received ATM cells of said prescribed structure into said RTSs and parallel data, an RTS receiver circuit for regenerating said first clock as they originally were on the basis of said separated time information RTSs and network clock, and a parallel-to-serial converter for obtaining said HDTV serial digital signals from said separated parallel data and said first clock from said RTS receiver circuit, wherein:

said RTS generator circuit has:
first frequency dividing means for dividing said network clock into a second clock of a prescribed frequency,
  a first counter for dividing said first clock into a 1/N frequency, and
  a latch circuit for latching at the output timing of said first counter the second clock resulting from the frequency division by said first frequency dividing means to supply said time information RTSs,
said RTS receiver circuit comprises:
second frequency dividing means for dividing the frequency of said network clock into said prescribed frequency,
gate pulse generating means for generating a gate pulse on the basis of said network clock,
memory means for temporarily storing said RTSs which have been transmitted,
a comparator for comparing the clock resulting from frequency division by said second frequency dividing means and said RTSs read out of said memory means,
a gate circuit for gating the output signal of said comparator on the basis of said gate pulse from said gate pulse generating means, and
frequency multiplying means for regenerating said first clock frequency by multiplying the frequency of the output signal of said gate circuit to said N-multiplied frequency, wherein:
said ATM cell processing unit, besides selecting 8 as the value of said N, multiplexes 180 bytes of said HDTV serial digital signals on four of said ATM cells to generate ATM cells on whose remainder of payload are multiplexed nine of said time information RTSs corresponding to the 180 bytes of HDTV serial digital signals.

5. A serial digital signal transmission apparatus comprising a serial-to-parallel converter for separating high definition television (HDTV) serial digital signals to be transmitted into a parallel data and a first clock, a residual time stamp (RTS) generator circuit for generating time information RTSs on the basis of said first clock and a network clock, an ATM cell processing unit for assembling said RTSs and parallel data into asynchronous transfer mode (ATM) cells of a prescribed structure and transmitting the assembled cells and separating received ATM cells of said prescribed structure into said RTSs and parallel data, an RTS receiver circuit for regenerating said first clock as they originally were on the basis of said separated time information RTSs and network clock, and a parallel-to-serial converter for obtaining said HDTV serial digital signals from said separated parallel data and said first clock from said RTS receiver circuit, wherein:

said RTS generator circuit has: first frequency dividing means for dividing said network clock into a second clock of a prescribed frequency,
a first counter for dividing said first clock into a 1/N frequency, and
a latch circuit for latching at the output timing of said first counter the second clock resulting from the frequency division by said first frequency dividing means to supply said time information RTSs,
said RTS receiver circuit comprises:
second frequency dividing means for dividing the frequency of said network clock into said prescribed frequency,
gate pulse generating means for generating a gate pulse on the basis of said network clock,
memory means for temporarily storing said RTSs which have been transmitted,
a comparator for comparing the clock resulting from frequency division by said second frequency dividing means and said RTSs read out of said memory means,
a gate circuit for gating the output signal of said comparator on the basis of said gate pulse from said gate pulse generating means, and
frequency multiplying means for regenerating said first clock frequency by multiplying the frequency of the output signal of said gate circuit to said N-multiplied frequency, wherein:
said ATM cell processing unit, besides selecting 8 as the value of said N, multiplexes 5500 bytes of said HDTV serial digital signals on 123 of said ATM cells to generate ATM cells on whose remainder of payload are multiplexed 275 of said time information RTSs corresponding to the 5500 bytes of HDTV serial digital signals.

6. A serial digital signal transmission apparatus comprising a serial-to-parallel converter for separating high definition television (HDTV) serial digital signals to be transmitted into a parallel data and a first clock, a residual time stamp value (RTS) generator circuit for generating time information RTSs on the basis of said first clock and a network clock, an ATM cell processing unit for assembling said RTSs and parallel data into asynchronous transfer mode (ATM) cells of a prescribed structure and transmitting the assembled cells and separating received ATM cells of said prescribed structure into said RTSs and parallel data, an RTS receiver circuit for regenerating said first clock as they originally were on the basis of said separated time information RTSs and network clock, and a parallel-to-serial converter for obtaining said HDTV serial digital signals from said separated parallel data and said first clock from said RTS receiver circuit, wherein:

said RTS generator circuit has:

first frequency dividing means for dividing said network clock into a second clock of a prescribed first frequency, a first counter for dividing said first clock into a 1/N frequency, and a latch circuit for latching at the output timing of said first counter the second clock resulting from the frequency division by said first frequency dividing means to supply said time information RTSs, said RTS receiver circuit comprises:

second frequency dividing means for dividing the frequency of said network clock into said prescribed frequency, gate pulse generating means for generating a gate pulse on the basis of said network clock, memory means for temporarily storing said RTSs which have been transmitted, a comparator for comparing the clock resulting from frequency division by said second frequency dividing means and said RTSs read out of said memory means, a gate circuit for gating the output signal of said comparator on the basis of said gate pulse from said gate pulse generating means, and frequency multiplying means for regenerating said first clock frequency by multiplying the frequency of the output signal of said gate circuit to said N-multiplied frequency, wherein:

said ATM cell processing unit, besides selecting 15 as the value of said N, multiplexes 375 bytes of said HDTV serial digital signals on eight of said ATM cells to generate ATM cells on whose remainder of payload and RTS area of Segmentation and Reassembly Protocol Data Unit (SAR-PDU) header are multiplexed 10 of said time information RTSs corresponding to the 375 bytes of HDTV serial digital signals.

* * * * *